Sept. 16, 1958     O. E. ANDRUS     2,852,462
HOT WATER STORAGE TANK
Filed March 17, 1955
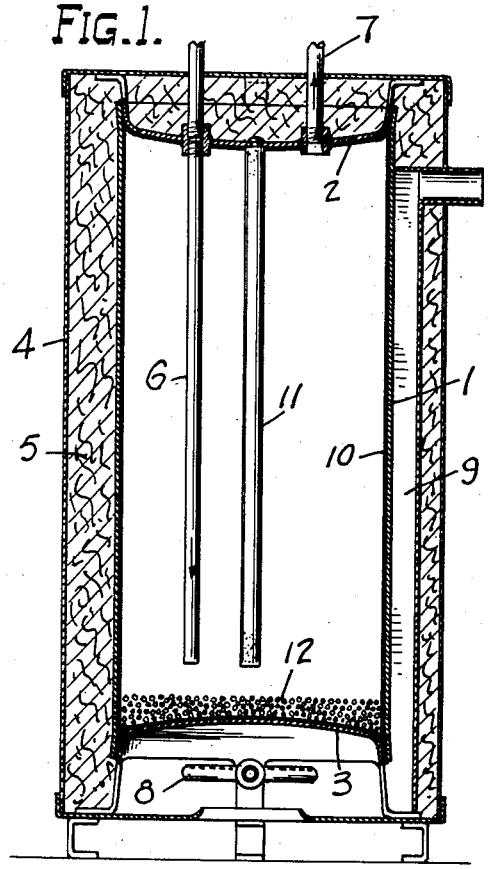
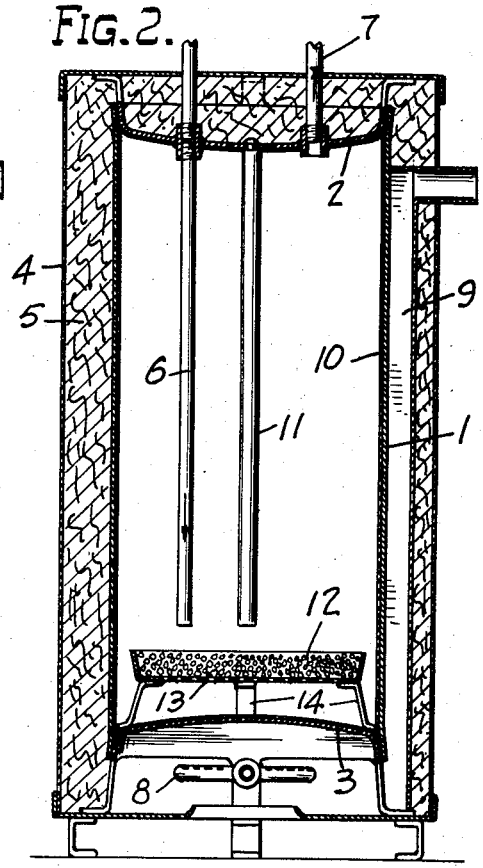
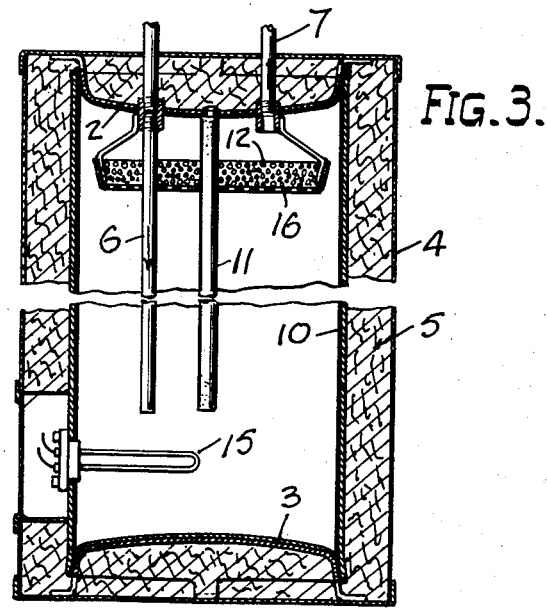
INVENTOR.
Orrin E. Andrus
BY
ATTORNEYS.

United States Patent Office 2,852,462
Patented Sept. 16, 1958

2,852,462

HOT WATER STORAGE TANK

Orrin E. Andrus, Milwaukee, Wis., assignor to A. O. Smith Corporation, Milwaukee, Wis., a corporation of New York Application March 17, 1955, Serial No. 494,920

8 Claims. (Cl. 204—197)

The invention relates to a water storage tank and more particularly to a glass-lined hot water storage tank having means for inhibiting the solution of the glass lining by the hot water.

The conventional water storage vessel, such as a hot water heater, is composed of a ferrous tank and is lined with glass or vitreous enamel. To protect any uncoated metal areas of the tank or portions of the tank which are exposed through defects in the glass lining from corrosion, a cathodic protection system, which may take the form of a consumable anode, is ordinarily employed with the glass lining. Neither the glass lining nor the cathodic protection system are practical by themselves as a means for protecting the tank over long periods for the glass coating will contain minute imperfections and concentrated corrosion of the metal of the tank exposed through these imperfections will occur during service. Similarly, if cathodic protection is employed alone, in an attempt to protect an uncoated metal tank, the area of the exposed metal to be protected is so great that an anode of reasonable size will corrode and be expended in a very short period of time. However, in combination the glass lining and the cathodic system will give excellent protection to a ferrous tank for the lining covers substantially the entire surface of the tank and the cathodic system merely is required to protect the small areas of metal exposed through the lining.

Over extended periods of time the glass coating of the storage tank may tend to dissolve in the hot water contained within the tank. This solution of the glass coating will increase the amount of the exposed metal area of the tank. This increase in exposed metal area to be protected will require an increased current density at the anode and will thereby cause the anode to corrode more rapidly. The generally accepted theory explaining the solution of the glass coating in hot water is that the water leaches out the alkaline radical, such as sodium or potassium, leaving the relatively insoluble ions of silicates. The leaching out of the alkaline ions undermines the silicate particles and eventually causes erosion of the coating.

The present invention is based on the discovery that the rate of solution of glass in hot water decreases as the relatively insoluble constituents of the glass go into solution. In other words, it was found that the rate of solution of the glass lining could be substantially reduced by placing within the tank a solid material having a relatively insoluble constituent which corresponded to the relatively insoluble constituent normally dissolved from the glass lining of the tank. The added material will be slowly dissolved by the hot water in the tank and thereby reduce the rate of solution of the glass coating.

More specifically, the present invention is directed to a glass-lined cathodically protected water storage tank having a mass of relatively insoluble material disposed within the tank in contact with the water therein. The material has one or more constituents of very low solubility common to the glass of the tank lining and is of sufficient quantity and surface area so that under given temperature, pressure and water flow conditions encountered in the tank at any given time, the low solubility constituents dissolving from the glass lining add less to the total concentration than do these same constituents dissolving from the added material.

The added material is preferably located in the tank at a position where the temperature and rate of water flow are greatest. The material slowly dissolves in the water of the tank and inhibits the solution of the glass coating so that the coating will be retained for an increased period of time. As the solution of the coating is thereby decreased, the cathodic protection system can function for a longer period of time to protect the small areas of exposed metal of the tank.

The drawings furnished herewith illustrate the best mode presently contemplated of carrying out the invention.

In the drawings:

Figure 1 is a vertical section of a hot water heater embodying the present invention;

Fig. 2 is a view similar to Figure 1 showing a modified form of the invention; and Fig. 3 is a view similar to Figure 1 showing a second modification of the invention.

Referring to Figure 1, there is shown a typical hot water heater which includes a ferrous tank to contain water to be heated. The tank is composed of a generally cylindrical shell 1 which is closed at the ends by dish-shaped heads 2 and 3. The tank is enclosed in an exterior casing 4 and a layer of insulating material 5 is disposed in the annular clearance between the tank and casing 4.

Water is introduced into the tank through a dip tube 6 which extends through a suitable opening in top head 2 and terminates adjacent the bottom head 3. Water is withdrawn from the tank through an outlet 7 which is disposed in a suitable opening in the upper head 2.

The water in the tank is heated by a gas burner 8 which is spaced beneath the lower head 3. The gases from the burner 8 pass through a flue 9 which extends upwardly along the tank and extends outwardly through the casing 4 to discharge the flue gases to the exterior.

To reduce the amount of surface of the tank exposed to the corrosive action of the water therein, the interior wall of the tank and the fittings are coated with a thin layer of glass or vitreous enamel 10. The glass coating 10 generally consists of a number of complex silicate compounds of aluminum, calcium, magnesium, boron and the like. The particular composition of the glass may vary substantially but a glass having the following composition by weight has proven very satisfactory for use as the coating 10:

| | Percent |
|---|---|
| Boric oxide | 15.2 |
| Zirconium dioxide | 10.7 |
| Sodium oxide | 14.7 |
| Calcium oxide | 3.6 |
| Iron and aluminum oxide | 2.0 |
| Titanium dioxide | 2.5 |
| Manganese oxide | 0.8 |
| Potassium oxide | 0.4 |
| Cobalt oxide | 1.5 |
| Lithium oxide | 0.1 |
| Silica dioxide | Balance |

To protect any uncoated metal areas of the tank from corrosion or any metal areas exposed through imperfections in coating 10, a cathodic protection system is applied to the tank. As shown in the drawings, the cathodic protection system may take the form of an expendable anode 11 composed of a metal such as magnesium which is electrically negative with respect to the metal of the tank. The anode 11 is suspended from the upper head 2 and connected electrically to the tank. The water in the tank completes a galvanic circuit in which the anode will corrode preferably to protect any metal of the tank exposed through imperfectionns in the glass lining 10.

Over extended periods of time the glass coating 10 may slowly dissolve in the water being heated in the tank. The rate of solution of the glass will be increased in soft, alkaline or hot waters. In some extreme conditions the glass coating 10 may be substantially dissolved within a period of two or three years so that the exposed metal surfaces of the tank to be protected by the anode have increased such that the current density at the cathode no longer is adequate to protect the exposed cathodic areas from corrosion.

To inhibit the solution of the glass 10, a mass of divided solid, relatively insoluble material 12 is placed in the tank in contact with the water therein. The material 12 slowly dissolves in the hot water in the tank and thereby reduces the rate of solution of the glass coating 10.

The mass of material 12 should have a rate of solution, in the physical consistency used and under given pressure, temperature and water flow conditions, equal to or greater than the rate of solution of the glass coating 10 so that at least as great a quantity of the material 12 will dissolve in the water in a given time, as that of the glass coating 10. Generally the solubility of the material in hot water should be less than 0.002 gram per 100 milliliters. The term "hot water" indicates water generally within the range of 140° F. to the boiling temperature thereof at the particular pressure in the tank, and more particularly to water at a temperature of about 160° F. as normally encountered in a domestic hot water heater.

The material 12 has at least one relatively insoluble constituent common to a dissolved constituent of the glass coating 10 and will generally be a glass or silicate compound. For example, the material 12 may be a glass frit having substantially the same composition as the frit of the glass coating 10 or it may be a silicaate compound of calacium, aluminum, magnesium or the like having ahe desired rate of solution.

The material 12 should have a surface area at least as great as the surface area of the glass coating 10 in order that the material 12 will dissolve at a rate sufficient to inhibit the solution of the glass coating 10. Ordinarily, the material is employed in a finely divided or porous state and may take the form of powder, granules, chunks, fibers or the like which will provide a large surface area per unit volume.

Generally, the weight of the material 12 in a divided solid state should be greater than the total weight of the glass coating 10 so that the life of the coating 10 will be appreciably extended.

The material 12 should be located in a position in the tank where the highest temperature and greatest rate of flow of water are encountered. As shown in Figure 1, the material is disposed on the lower head 3 directly above burner 8. The incoming water discharged through dip tube 6 will agitate the material to increase the rate of solution of the material. The glass coating 10 will dissolve in the water of the tank along with the material 12, but the solution of the material 12 will reduce the rate of solution of the coating 10 and thus the coating will be retained for a longer period.

Fig. 2 shows a water heater similar in structure to that of Figure 1. The material 12 is disposed in a porous or open basket 13 which is supported above head 3 by legs 14. As in the case of the first embodiment he material 12 is dissolved in the water of the tank to decrease the rate of solution of the glass coating.

Fig. 3 is a second modification of the invention as applied to a water heater having an electrical heating element 15 disposed within the tank to heat the water. As the hot water in this tank is adjacent the upper head 2 the material 12 is disposed within basket 16 which is secured to the tank fittings adjacent the upper head. As in the first two embodiments the material 12 dissolves to decrease the rate of solution of the glass coating 10. It is contemplated that the basket 16 can also be positioned adjacent the heating element 15, if desired, rather than adjacent the head 2.

The present invention provides a cathodically protected glass-lined water tank in which the rate of solution of the glass coating in the hot water is substantially reduced by using a divided solid, relatively insoluble material in the tank. The added material will slowly dissolve in the water and this will reduce the rate of solution of the glass coating. As the rate of solution of the glass coating is decreased the cathodic protection system will function for a substantially longer period to protect the exposed metal areas of the tank.

Various modes of carrying out the invention are contemplated as being within the scope of the following claims particularly pointing out and distinctly claiming the subject matter which is regarded as the invention.

I claim:

1. A hot water storage structure comprising a ferrous metal tank adapted to contain water to be heated, a heating unit to heat said water, means for introducing cold water to said tank and for withdrawing hot water from the tank, a coating of glass fused to the inner surface of said tank and subjected to solution by the hot water in the tank, a cathodic protection system associated with the tank to protect areas of the tank exposed to the corrosive action of the water through openings in the glass coating, and a divided solid material disposed in the tank in contact with the hot water therein and having a greater weight and surface area than the total weight and surface area of the glass coating, said material having at least one relatively insoluble constituent common to a constituent of the glass of the coating and having a rate of solution in the physical form employed in the tank and under the conditions of temperature and pressure and rate of water flow encountered in the tank at least as great as the rate of solution of said glass coating, said material being slowly dissolved by the hot water in the tank to inhibit the solution of the glass coating.

2. A hot water storage structure, comprising a ferrous metal tank adapted to contain water to be heated, a heating unit to heat said water, means for introducing cold water to said tank and for withdrawing hot water from the tank, a coating of glass fused to the inner surface of said tank and subjected to solution by the hot water in the tank, a cathodic protection system associated with the tank to protect areas of the tank exposed to the corrosive action of the water through imperfections in the glass coating, and a quantity of divided solid glass disposed within the tank in contact with the water therein, said divided solid glass having at least one relatively insoluble constituent common to a constituent of the glass of the coating and having a greater weight and surface area than the total weight and surface area of said glass coating and being slowly dissolved by the hot water in said tank to inhibit the solution of said glass coating in said hot water.

3. A hot water storage structure, comprising a ferrous metal tank adapted to contain water to be heated, a heating unit to heat said water, means for introducing cold water to said tank and for withdrawing hot water from the tank, a coating of glass containing a substantial portion of relatively insoluble metal silicates fused to the inner surface of said tank and subjected to solution by the hot water in the tank, a fixed potential cathodic protection system associated with the tank to protect areas of the tank exposed to the corrosive action of the water through openings in the glass coating, and a mass of a solid metal silicate compound containing a substantial portion of relatively insoluble metal silicates corresponding to those of said coating and disposed within the tank in contact with the hot water therein, said compound being subjected to solution by said hot water and having a rate of solution in the physical form employed in the tank and under the conditions of temperature and pressure and rate of water flow encountered in the tank, such that of the total dissolved constituents emanating from both the glass coating and said compound at least half of said total dissolved constitutents present in the water at a given time come from said compound to thereby reduce the rate of solution of said glass coating in said hot water.

4. A hot water storage structure comprising a ferrous metal tank adapted to contain water to be heated, a heating unit to heat said water, means for introducing cold water to said tank and for withdrawing hot water from the tank, a coating of glass fused to the inner surface of said tank and subjected to solution by the hot water in the tank, a cathodic protection system associated with the tank to protect areas of the tank exposed to the corrosive action of the water through imperfections in the glass coating, and a quantity of glass disposed within a portion of the tank wherein the temperature is relatively high and the rate of water flow is relatively great, said glass having a composition similar to the composition of the glass coating and having an effective surface area exposed to the hot water at least as great as the surface area of the glass coating, said glass slowly dissolving in the hot water and thereby inhibiting the solution of the glass coating.

5. A hot water storage structure comprising a ferrous metal tank adapted to contain water to be heated, a heating unit to heat said water, means for introducing cold water to said tank and for withdrawing hot water from the tank, a coating of glass fused to the inner surface of said tank and subjected to solution by the hot water in the tank, a cathodic protection system associated with the tank to protect areas of the tank exposed to the corrosive action of the water through openings in the glass coating, and a solid material substantially free of alkali metal ions disposed in the tank in contact with the water therein, said material having at least one relatively insoluble constituent common to a constituent of the glass of the coating and having a greater weight than the weight of said coating, said material having a rate of solution in the physical form employed in the tank and under the conditions of tempeature and pressure and rate of water flow encountered in the tank sufficiently low to permit the material to be slowly dissolved by the hot water in the tank to substantially reduce the rate of solution of the glass coating.

6. A method of inhibiting the solution of the glass lining of a hot water heater by the heated water contained within the tank, comprising increasing the concentration in the water of a relatively insoluble constituent common to the glass lining by adding to said water a separate material containing said constituent.

7. In a glass lined hot water storage tank wherein the glass lining of the tank contains a substantial portion of relatively insoluble fused compounds, a mass of divided solid material composed principally of said relatively insoluble fused compounds and having a surface area substantially greater than that of said glass lining, and disposed within the tank to be submerged in the water therein.

8. A hot water storage storage structure comprising a ferrous metal tank adapted to contain water to be heated, a heating unit to heat said water, means for introducing cold water to said tank and for withdrawing hot water from the tank, a coating of glass fused to the inner surface of said tank and subjected to solution by the hot water in the tank, a cathodic protection system associated with the tank to protect areas of the tank exposed to the corrosive action of the water through imperfections in the glass coating, and a quantity of glass of similar composition to that of said lining and disposed within the tank in a physical form providing a total surface area therefore exposed to the water in the tank greater than the exposed surface area of said lining.

No references cited.